United States Patent
Koh et al.

(10) Patent No.: US 10,665,897 B2
(45) Date of Patent: May 26, 2020

(54) LITHIUM SECONDARY BATTERY INCLUDING PHOSPHITE ADDITIVE

(71) Applicants: Samsung Electronics Co., Ltd., Suwon-si, Gyeonggi-do (KR); Samsung SDI Co., Ltd., Yongin-si, Gyeonggi-do (KR)

(72) Inventors: Myongchun Koh, Hwaseong-si (KR); Yoonsok Kang, Seongnam-si (KR); Eunha Park, Seoul (KR); Insun Park, Seongnam-si (KR); Jihyun Jang, Seoul (KR)

(73) Assignees: SAMSUNG ELECTRONICS CO., LTD., Gyeonggi-Do (KR); SAMSUNG SDI CO., LTD., Gyeonggi-Do (KR)

(*) Notice: Subject to any disclaimer, the term of this patent is extended or adjusted under 35 U.S.C. 154(b) by 151 days.

(21) Appl. No.: 15/796,752

(22) Filed: Oct. 28, 2017

(65) Prior Publication Data
US 2018/0053967 A1 Feb. 22, 2018

(30) Foreign Application Priority Data
May 26, 2017 (KR) .................. 10-2017-0065626

(51) Int. Cl.
| | |
|---|---|
| H01M 10/056 | (2010.01) |
| H01M 10/0567 | (2010.01) |
| H01M 10/0562 | (2010.01) |
| H01M 4/505 | (2010.01) |
| H01M 4/131 | (2010.01) |
| H01M 4/133 | (2010.01) |
| H01M 4/38 | (2006.01) |
| H01M 10/052 | (2010.01) |
| H01M 10/0569 | (2010.01) |
| C07F 9/145 | (2006.01) |
| H01M 4/36 | (2006.01) |
| H01M 10/0568 | (2010.01) |
| H01M 4/587 | (2010.01) |
| H01M 4/134 | (2010.01) |
| C07F 9/142 | (2006.01) |
| H01M 10/0525 | (2010.01) |
| H01M 4/525 | (2010.01) |
| H01M 10/0564 | (2010.01) |
| C07F 9/141 | (2006.01) |
| H01M 4/02 | (2006.01) |

(52) U.S. Cl.
CPC ......... *H01M 10/0567* (2013.01); *C07F 9/142* (2013.01); *C07F 9/145* (2013.01); *H01M 4/131* (2013.01); *H01M 4/133* (2013.01); *H01M 4/134* (2013.01); *H01M 4/364* (2013.01); *H01M 4/386* (2013.01); *H01M 4/505* (2013.01); *H01M 4/525* (2013.01); *H01M 4/587* (2013.01); *H01M 10/052* (2013.01); *H01M 10/0525* (2013.01); *H01M 10/0562* (2013.01); *H01M 10/0564* (2013.01); *H01M 10/0568* (2013.01); *H01M 10/0569* (2013.01); *C07F 9/141* (2013.01); *H01M 2004/027* (2013.01); *H01M 2300/0034* (2013.01)

(58) Field of Classification Search
CPC ......... H01M 10/0564; H01M 10/0567; H01M 10/0568; H01M 10/0569
USPC .................................................. 429/345
See application file for complete search history.

(56) References Cited

U.S. PATENT DOCUMENTS

| | | | |
|---|---|---|---|
| 6,232,020 B1 | 5/2001 | Song et al. | |
| 2002/0000644 A1 | 1/2002 | Jeon et al. | |
| 2002/0009644 A1 | 1/2002 | Yoshimura et al. | |
| 2003/0157413 A1 | 8/2003 | Chen et al. | |
| 2007/0015053 A1 | 1/2007 | Morris | |
| 2008/0118843 A1 | 5/2008 | Tarnopolsky | |
| 2012/0231325 A1 | 9/2012 | Yoon et al. | |
| 2015/0249248 A1* | 9/2015 | Ishizaki | C01G 53/42 429/223 |

(Continued)

FOREIGN PATENT DOCUMENTS

| | | |
|---|---|---|
| CN | 102642024 A | 8/2012 |
| JP | 2006520082 A | 8/2006 |

(Continued)

*Primary Examiner* — James M Erwin
(74) *Attorney, Agent, or Firm* — Cantor Colburn LLP

(57) ABSTRACT

A lithium secondary battery includes a positive electrode; a negative electrode; and an electrolyte disposed between the positive electrode and the negative electrode, wherein the positive electrode includes a positive active material represented by Formula 1, and the electrolyte includes a lithium salt; a non-aqueous solvent; and a phosphite compound represented by Formula 2, wherein the phosphite compound is present in amount of about 0.1 wt % to about 5 wt % based on a total weight of the electrolyte:

$$Li_xNi_yM_{1-y}O_{2-z}A_z \quad \text{Formula 1}$$

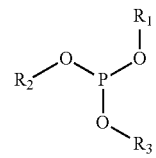

Formula 2 wherein, in Formula 1,
$0.9 \leq x \leq 1.2$, $0.7 \leq y \leq 0.98$, and $0 \leq z < 0.2$;
M comprises Al, Mg, Mn, Co, Fe, Cr, V, Ti, Cu, B, Ca, Zn, Zr, Nb, Mo, Sr, Sb, W, Bi, or a combination thereof; and
A is an element having an oxidation number of −1 or −2;
wherein in Formula 2,
$R_1$ to $R_3$ are independently an unsubstituted $C_1$-$C_{30}$ alkyl group or an unsubstituted $C_6$-$C_{60}$ aryl group.

20 Claims, No Drawings

(56) References Cited

U.S. PATENT DOCUMENTS

| | | | |
|---|---|---|---|
| 2016/0028111 A1* | 1/2016 | Ahn | H01M 10/052 429/303 |
| 2016/0126593 A1* | 5/2016 | Abe | H01M 6/162 429/332 |
| 2016/0315351 A1 | 10/2016 | Kotou et al. | |

FOREIGN PATENT DOCUMENTS

| | | |
|---|---|---|
| JP | 2015026589 A | 2/2015 |
| JP | 2016076425 A | 5/2016 |
| KR | 20000072956 A | 12/2000 |
| WO | 2015093091 A1 | 6/2015 |

\* cited by examiner

LITHIUM SECONDARY BATTERY INCLUDING PHOSPHITE ADDITIVE

CROSS-REFERENCE TO RELATED APPLICATION

This application claims priority to and the benefit of Korean Patent Application No. 10-2017-0065626, filed on May 26, 2017, in the Korean Intellectual Property Office, and all the benefits accruing therefrom under 35 U.S.C. § 119, the content of which is incorporated herein by reference in its entirety.

BACKGROUND

1. Field

The present disclosure relates to a lithium secondary battery including a phosphite additive.

2. Description of the Related Art

Lithium secondary batteries are used as energy sources for portable electronic devices, such as camcorders, mobile phones, and laptop computers. Lithium secondary batteries may be rechargeable at high rates and have an energy density per unit weight that is about three times higher than lead storage batteries, nickel-cadmium (Ni—Cd) batteries, nickel-hydride batteries, and nickel-zinc batteries.

A positive active material in a positive electrode of lithium secondary batteries may be a lithium-containing metal oxide. For example, a composite oxide of lithium and a metal such as cobalt, manganese, nickel, or a combination thereof, may be used as a positive active material. Positive active materials containing a large amount of Ni can be used to realize a battery having increased capacity as compared with a battery including a lithium-cobalt oxide.

However, in the case of Ni-rich positive active materials, the positive active material may have a surface having a weak structure, and thus the positive active material may have poor lifespan characteristics and increased resistance.

Therefore, there remains a need for a lithium secondary battery which exhibits large capacity, excellent lifespan characteristics, and low resistance and which includes a Ni-rich positive active material.

SUMMARY

Provided is a lithium secondary battery having a novel structure.

According to an aspect of an embodiment, a lithium secondary battery includes a positive electrode; a negative electrode; and an electrolyte disposed between the positive electrode and the negative electrode, wherein the positive electrode includes a positive active material represented by Formula 1, and wherein the electrolyte includes a lithium salt; a non-aqueous solvent; and a phosphite compound represented by Formula 2, wherein the phosphite compound is present in an amount in a range of about 0.1 weight % (wt %) to about 5 wt % based on a total weight of the electrolyte:

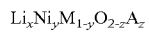

Formula 1

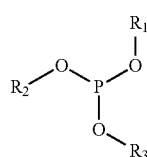

Formula 2

In Formula 1, $0.90 \leq x \leq 1.2$, $0.7 \leq y \leq 0.98$, and $0 \leq z < 0.2$;

M includes Al, Mg, Mn, Co, Fe, Cr, V, Ti, Cu, B, Ca, Zn, Zr, Nb, Mo, Sr, Sb, W, Bi, or a combination thereof; and A is an element having an oxidation number of −1 or −2; and In Formula 2, $R_1$ to $R_3$ are each independently an unsubstituted linear or branched $C_1$-$C_{30}$ alkyl group or an unsubstituted $C_6$-$C_{60}$ aryl group.

Additional aspects will be set forth in part in the description which follows and, in part, will be apparent from the description, or may be learned by practice of the presented embodiments.

DETAILED DESCRIPTION

Reference will now be made in detail to embodiments. In this regard, the present embodiments may have different forms and should not be construed as being limited to the descriptions set forth herein. Accordingly, the embodiments are merely described below, to explain aspects. Rather, these embodiments are provided so that this disclosure will be thorough and complete, and will fully convey the scope of the invention to those skilled in the art.

When an element or layer is referred to as being "on" or "above" another element or layer, it includes the element or layer that is directly or indirectly in contact with another element or layer. Thus it will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items. Expressions such as "at least one of," when preceding a list of elements, modify the entire list of elements and do not modify the individual elements of the list. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element. It will be understood that relative terms are intended to encompass different orientations of the device. For example, if the device is turned over, elements described as being on the "lower" side of other elements would then be oriented on "upper" sides of the other elements. The exemplary term "lower," can therefore, encompasses both an orientation of "lower" and "upper," depending on the particular orientation. Similarly, if the device is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

"Alkyl" means a straight or branched chain, saturated, monovalent hydrocarbon group (e.g., methyl or hexyl).

"Aryl" means a monovalent group formed by the removal of one hydrogen atom from one or more rings of an arene (e.g., phenyl or naphthyl).

As used herein, the term "cyclic carbonate" refers to a carbonate compound having at least one ring and in which a carbonate group (—O(C=O)O—) forms a part of the ring.

"Halogen" means one of the elements of Group 17 of the periodic table (e.g., fluorine, chlorine, bromine, iodine, and astatine).

Hereinafter, a lithium secondary battery according to an embodiment will be described in detail.

The lithium secondary battery according to an embodiment includes a positive electrode; a negative electrode; and an electrolyte disposed between the positive electrode and the negative electrode, wherein the positive electrode includes a positive active material represented by Formula 1, wherein the electrolyte includes a lithium salt; a non-aqueous solvent; and a phosphite compound represented by Formula 2, and wherein the phosphite compound is present in an amount in a range of about 0.1 wt % to about 5 wt % based on the total weight of the electrolyte:

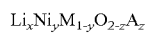  Formula 1

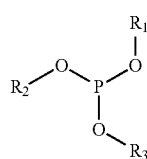  Formula 2

In Formula 1,
$0.9 \leq x \leq 1.2$, $0.7 \leq y \leq 0.98$, and $0 \leq z < 0.2$;

M includes Al, Mg, Mn, Co, Fe, Cr, V, Ti, Cu, B, Ca, Zn, Zr, Nb, Mo, Sr, Sb, W, Bi, or a combination thereof; and A is an element having an oxidation number of −1 or −2; and in Formula 2,
$R_1$ to $R_3$ are each independently an unsubstituted linear or branched $C_1$-$C_{30}$ alkyl group or an unsubstituted $C_6$-$C_{60}$ aryl group.

Despite the advantages of manufacturing a high capacity battery, a lithium metal composite oxide containing a large amount of Ni may have problems such as severe deterioration of lifespan characteristics including a capacity retention ratio or a resistance increase ratio, and thus it may be difficult to commercialize the lithium metal composite oxide. The deterioration may be caused by elution of cation $Ni^{3+}$ from the positive electrode and by disproportionation that causes some of the cation $Ni^{3+}$ to become $Ni^{4+}$ during a discharging process and producing NiO. Due to such problems, lifespan characteristics of the lithium battery may be deteriorated, and resistance may increase.

To resolve the above-described problems, the lithium secondary battery includes an electrolyte including the phosphite compound represented by Formula 2, which protects the cation $Ni^{3+}$, and thus the elution and disproportionation of the cation $Ni^{3+}$ may be prevented.

In particular, the phosphite compound may have high affinity for the cation $Ni^{3+}$, thereby suppressing side reactions of the cation $Ni^{3+}$, and, in particular, even in a battery that may be operated at a high voltage, high affinity with the cation $Ni^{3+}$ may be maintained, and through this, the elution of the cation $Ni^{3+}$ or the disproportionation of the cation $Ni^{3+}$ to $Ni^{4+}$ and producing NiO may be suppressed.

Here, the phosphite compound included in the electrolyte may be present in an amount in a range of about 0.1 wt % to about 5 wt % based on the total weight of the electrolyte. However, embodiments are not limited thereto, and the amount may be in any range that may stabilize the positive active material so that lifespan characteristics, such as, a good capacity retention ratio or resistance increase ratio, may be manifested. When the amount of the phosphite compound is lower than about 0.1 wt %, the amount is too small to protect cation $Ni^{3+}$, and resistance decrease effects may not be sufficient. When the amount of the phosphite compound is greater than about 5 wt %, self decomposition of the phosphite compound may occur, which may result in an increase in film resistance and deterioration of battery capacity, storage stability, and cycle characteristics.

For example, the phosphite compound may be present in an amount in a range of about 0.1 wt % to about 4 wt % based on the total weight of the electrolyte. For example, the phosphite compound may be present in an amount in a range of about 0.1 wt % to about 3 wt % based on the total weight of the electrolyte. For example, the phosphite compound may be present in an amount in a range of about 0.1 wt % to about 3 wt % based on the total weight of the electrolyte. For example, the phosphite compound may be present in an amount in a range of about 0.3 wt % to about 3 wt % based on the total weight of the electrolyte. For example, the phosphite compound may be present in an amount in a range of about 0.3 wt % to about 2 wt % based on the total weight of the electrolyte. For example, the phosphite compound may be present in an amount in a range of about 0.5 wt % to about 2 wt based on the total weight of the electrolyte. For example, the phosphite compound may be present in an amount in a range of about 0.5 wt % to about 1.5 wt % based on the total weight of the electrolyte.

$R_1$ to $R_3$ may each be independently an unsubstituted linear or branched $C_1$-$C_{30}$ alkyl group and an unsubstituted $C_6$-$C_{60}$ aryl group.

In one embodiment, $R_1$ to $R_3$ may each be independently selected from an unsubstituted linear or branched $C_3$-$C_{30}$ alkyl group and a $C_6$-$C_{60}$ aryl group.

The unsubstituted $C_3$-$C_{30}$ alkyl group may be, for example, a propyl group, an isopropyl group, a butyl group, or a tert-butyl group, but embodiments are not limited thereto.

The unsubstituted $C_6$-$C_{60}$ aryl group may be, for example, a phenyl group, a biphenyl group, or a tert-phenyl group, but embodiments are not limited thereto.

In one embodiment, the phosphite compound may include tributyl phosphite, triphenyl phosphite, tris(o-tolyl)phosphite, or a combination thereof.

The electrolyte includes a lithium salt. The lithium salt may be dissolved in an organic solvent and thus may serve as a source of lithium ions in a battery and, for example, may promote migration of lithium ions between the positive electrode and the negative electrode.

An anion of the lithium salt included in the electrolyte include $PF_6^-$, $BF_4^-$, $SbF_6^-$, $AsF_6^-$, $C_4F_9SO_3^-$, $ClO_4^-$, $AlO_2^-$, $AlCl_4^-$, $C_xF_{2x+1}SO_3^-$ (where, x is a natural number), $(C_xF_{2x+1}SO_2)(C_yF_{2y+1}SO_2)N^-$ (where, x and y are a natural number), a halide, or a combination thereof.

For example, the lithium salt may include lithium difluoro(oxalate)borate (LiDFOB), lithium bis(oxalate)borate (LiBOB), lithium difluorobis(oxalate)borate (LiDFOP), $LiBF_4$, $LiPF_6$, $LiCF_3SO_3$, $(CF_3SO_2)_2NLi$, $(FSO_2)_2NLi$, or a combination thereof. For example, the lithium salt may be LiDFOB or $LiPF_6$.

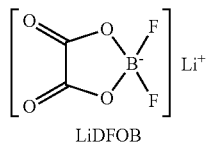

LiDFOB

Also, the lithium salt may include a plurality of salts and for example, may include $LiPF_6$ at a concentration in a range of about 0.6 molar (M) to about 2.0 M as a main salt and other salts such as lithium difluoro(oxalate)borate (LiDFOB), lithiumbis(oxalate)borate (LiBOB), lithium difluorobis(oxalate)borate (LiDFOP), $LiBF_4$, $LiPF_6$, $LiCF_3SO_3$, $(CF_3SO_2)_2NLi$, $(FSO_2)_2Ni$, or a combination thereof, in an amount not exceeding that of the main salt.

In particular, the lithium salt may include lithium difluoro(oxalate)borate (LiDFOB), lithium bis(oxalate)borate (LiBOB), lithium difluorobis(oxalate)borate (LiDFOP), $LiBF_4$, $LiPF_6$, $LiCF_3SO_3$, $(CF_3SO_2)_2NLi$, $(FSO_2)_2Ni$, or a combination thereof, at an amount in a range of about 0.5 wt % to about 10 wt %, based on the total weight of the electrolyte with respect to 1 M to 1.5 M $LiPF_6$.

However, the amount is not limited to this range, and the amount may be in any range that allows the electrolyte to effectively provide lithium ions and/or electrons during a charge/discharge process.

For example, the non-aqueous solvent may include a carbonate solvent, an ester solvent, an ether solvent, a ketone solvent, an aprotic solvent, or a combination thereof. Examples of the carbonate solvent may include dimethylcarbonate (DMC), diethylcarbonate (DEC), ethylmethyl carbonate (EMC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and tetraethylene glycol dimethyl ether (TEGDME), and examples of the ester solvent may include methyl acetate, ethyl acetate, n-propyl acetate, dimethyl acetate, methyl propionate, ethyl propionate, γ-butyrolactone, decanolide, valerolactone, mevalonolactone, and caprolactone. A combination comprising at least one of the foregoing may also be used.

The aprotic solvent may be used alone or in a mixture of one or more, and when the aprotic solvent is used in a mixture of one or more, the mixing ratio may be appropriately controlled, according to battery performance, as may be determined by one of ordinary skill in the art without undue experimentation.

The carbonate solvent may be a mixture of a chain carbonate and a cyclic carbonate. In this case, the volume ratio of the chain carbonate and the cyclic carbonate may be in a range of about 1:1 to about 1:9, to obtain excellent electrolyte performance.

In some embodiments, the non-aqueous solvent may further include fluoro-ethylene carbonate (FEC), vinylene carbonate (VC), vinylethylene carbonate (VEC), a phosphorus (P)-containing compound, a sulfur (S)-containing compound, or a combination thereof.

For example, the non-aqueous solvent may include fluoro-ethylene carbonate (FEC). For example, the lithium secondary battery may include FEC in an amount in a range of about 0.1 volume percent (vol %) to about 10 vol % based on the total volume of the non-aqueous solvent. For example, the lithium secondary battery may include FEC in an amount in a range of about 0.5 vol % to about 7 vol % based on the total volume of the non-aqueous solvent. For example, the lithium secondary battery may include FEC in an amount in a range of about 1 vol % to about 7 vol % based on the total volume of the non-aqueous solvent. For example, the lithium secondary battery may include FEC in an amount in a range of about 2 vol % to about 7 vol % based on the total volume of the non-aqueous solvent. When FEC is included in the non-aqueous solvent in an amount within the above-described ranges, a solid electrolyte interface (SEI) film that does not degrade a diffusion ratio of lithium ions, may be formed in a short period of time.

The electrolyte may include a carbonate including a carbon-carbon single bond or multiple bonds (e.g., a carbon-carbon double bond or a carbon-carbon triple bond), carboxylic acid anhydride including a carbon-carbon single or multiple bonds, or a combination thereof. The multiple bonds may be a double bond or a triple bond, and the carbonate and carboxylic acid anhydride may be linear or cyclic.

For example, the electrolyte may further include vinylene carbonate (VC), vinylethylene carbonate (VEC), maleic anhydride, succinic anhydride, or a combination thereof. For example, the lithium secondary battery may further include VC, VEC, maleic anhydride, succinic anhydride, or a combination thereof in an amount in a range of about 0.1 wt % to about 2 wt % based on the total weight of the electrolyte. For example, the lithium secondary battery may further include VC, VEC, maleic anhydride, succinic anhydride, or a combination thereof in an amount in a range of about 0.1 wt % to about 1.5 wt % based on the total weight of the electrolyte.

For example, the lithium secondary battery may further include VC, maleic anhydride, or a combination thereof in an amount in a range of about 0.1 wt % to about 2 wt % based on the total weight of the electrolyte. For example, the lithium secondary battery may further include VC, maleic anhydride, or a combination thereof in an amount in a range of about 0.1 wt % to about 1.5 wt % based on the total weight of the electrolyte.

In some embodiments, the electrolyte may further include maleic anhydride, but embodiments are not limited thereto. For example, the lithium secondary battery may further include maleic anhydride in an amount in a range of about 0.1 wt % to about 1.5 wt % based on the total weight of the electrolyte. For example, the lithium secondary battery may further include maleic anhydride in an amount in a range of about 0.1 wt % to about 1.0 wt % based on the total weight of the electrolyte. For example, the lithium secondary battery may further include maleic anhydride in an amount in a range of about 0.1 wt % to about 0.5 wt % based on the total weight of the electrolyte.

For example, the electrolyte may further include a phosphorus (P)-containing compound, a sulfur (S)-containing compound, or a combination thereof. For example, the electrolyte may further include a phosphorus (P)-containing compound, a sulfur (S)-containing compound, or a combination thereof in an amount in a range of about 0.1 wt % to about 3 wt % based on the total weight of the electrolyte. For example, the electrolyte may further include a phosphorus (P)-containing compound, a sulfur (S)-containing compound, or a combination thereof in an amount in a range of about 0.1 wt % to about 2 wt % based on the total weight of the electrolyte. For example, the electrolyte may further include a phosphorus (P)-containing compound, a sulfur (S)-containing compound, or a combination thereof in an amount in a range of about 0.5 wt % to about 2 wt % based on the total weight of the electrolyte.

The phosphorus (P)-containing compound may include a phosphine compound, a phosphate compound, or a combination thereof, and the sulfur (S)-containing compound may include a sulfone compound, a sulfonate compound, a disulfonate compound, or a combination thereof.

In some embodiments, the phosphine compound may be triphenylphosphine, tris(o-tolyl)phosphine, or tris(butyl) phosphine, but embodiments are not limited thereto. The phosphate compound may be, for example, trimethylphosphate, triethylphosphate, tripropylphosphate, or tributylphosphate, but embodiments are not limited thereto.

The sulfone compound may be, for example, ethylmethyl sulfone, bisphenyl sulfone, divinyl sulfone, tetramethylene sulfone, or a combination thereof, but embodiments are not limited thereto. The sulfonate compound may be, for example, methyl methane sulfonate, ethyl methane sulfonate, diallyl sufonate, or a combination thereof, but embodiments are not limited thereto. The disulfonate compound may be, for example, methylene methane disulfonate (MMDS), butanediol dimethane sulfonate (busulfan), tosyloxy disulfonate, or methylene bismethansulfonate, but embodiments are not limited thereto.

As described above, when a lithium metal oxide contains a large amount of Ni, despite the advantage of manufacturing a high capacity battery, the lifespan characteristics of a battery may deteriorate as an amount of cation $Ni^{3+}$ in the battery increases, and resistance may also increase. As described above, when a disulfonate compound is included, sulfonate may react with cation $Ni^{3+}$ and stabilize the cation $Ni^{3+}$, and thus resistance may decrease. Here, when an amount of the disulfonate compound exceeds about 2 wt % based on the total weight of the electrolyte, disulfonate may react with lithium cations generated from a positive active material, and thus lithium cations may be consumed and may not contribute to battery characteristics.

The phosphite compound represented by Formula 2 may be easily decomposed due to a reaction with the negative electrode, and, as described below, the lithium secondary battery including a negative active material or a carbonaceous negative active material, and which includes a metal alloyable with lithium, has problems of gas occurrence due to a catalyst function at a high temperature and deterioration of lifespan characteristics. As described above, when FEC, VC, VEC, a phosphorus (P)-containing compound, or a sulfur (S)-containing compound is included in an amount within the above-described ranges, a passivation layer containing a reaction product of the materials, that is, an SEI film, may be formed on a portion of the negative electrode surface or on an entire negative electrode surface. Since gas occurrence may be prevented due to the SEI film when the lithium secondary battery is preserved at a high temperature, the battery may have improved safety and performance.

Hereinafter, a structure of the lithium secondary battery will be described in detail.

The positive electrode includes the positive active material represented by Formula 1. In an embodiment, A in Formula 1 may be a halogen, S, or N, but embodiments are not limited thereto.

In Formula 1, y denotes an amount of Ni in the positive active material, which may satisfy $0.7 \leq y \leq 0.98$. For example, in Formula 1, y may satisfy $0.8 \leq y \leq 0.98$. When an amount of Ni in the positive active material is lower than 0.7 (i.e., 70%), the amount of Ni is too small, and thus a surface structure of the positive electrode is in a stable state. Therefore, deterioration of the Ni-rich positive active material, such as, by elution of Cation Ni3+ from the positive electrode or disproportionation reactions, may occur less, and as a result, lifespan characteristics may not be good because a phosphite compound having affinity with cation $Ni^{3+}$ attaches on a positive electrode surface, and thus resistance may increase.

For example, the positive active material may be represented by Formula 3 or Formula 4:

$$LiNi_{y'}Co_{1-y'-z'}Al_{z'}O_2 \qquad \text{Formula 3}$$

$$LiNi_{y'}Co_{1-y'-z'}Mn_{z'}O_2 \qquad \text{Formula 4}$$

In Formula 3 and Formula 4, $0.9 \leq x' \leq 1.2$, $0.8 \leq y' \leq 0.98$, $0 < z' < 0.1$, and $0 < 1-y'-z' < 0.2$.

For example, the positive electrode may include $Li_{1.02}Ni_{0.85}Co_{0.1}Mn_{0.05}O_2$, $Li_{1.02}Ni_{0.88}Co_{0.08}Mn_{0.04}O_2$, $Li_{1.02}Ni_{0.88}Co_{0.08}Al_{0.04}O_2$ $LiNi_{0.8}Co_{0.15}Al_{0.05}O_2$, $LiNi_{0.88}Co_{0.1}Al_{0.02}O_2$, $LiNi_{0.85}Co_{0.1}Al_{0.05}O_2$, $LiNi_{0.8}Co_{0.15}Mn_{0.05}O_2$, $LiNi_{0.88}Co_{0.1}Mn_{0.02}O_2$, and $LiNi_{0.85}Co_{0.1}Mn_{0.05}O_2$ as a positive active material. For example, the positive electrode may include at least one selected from $Li_{1.02}Ni_{0.80}Co_{0.15}Mn_{0.05}O_2$, $Li_{1.02}Ni_{0.85}Co_{0.10}Mn_{0.05}O_2$, $Li_{1.02}Ni_{0.88}Co_{0.08}Mn_{0.04}O_2$, $Li_{1.02}Ni_{0.88}Co_{0.08}Al_{0.04}O_2$, or a combination thereof, as a positive active material, but embodiments are not limited thereto.

The positive electrode may further include lithium cobalt oxide, lithium nickel cobalt manganese oxide, lithium nickel cobalt aluminum oxide, lithium iron phosphate, lithium manganese oxide, or a combination thereof, in addition to the foregoing positive active materials, but embodiments of the additional positive active materials are not limited thereto. Any suitable positive active material may further be included in the positive electrode.

In some embodiments, the positive active material may further include a compound represented by one of the following formulae.

$Li_aA_{1-b}B'_bD'_2$ (where $0.90 \leq a \leq 1.8$ and $0 \leq b \leq 0.5$); $Li_aE_{1-b}B'_bO_{2-c}D'_c$ (where $0.90 \leq a \leq 1.8$, $0 \leq b \leq 0.5$, and $0 \leq c \leq 0.05$); $LiE_{2-b}B'_bO_{4-c}D'_c$ (where $0 \leq b \leq 0.5$ and $0 \leq c \leq 0.05$); $Li_aNi_{1-b-c}Co_bB'_cD'_\alpha$ (where $0.90 \leq a \leq 1.8$, $0 \leq b \leq 0.5$, $0 \leq c \leq 0.05$, and $0 < \alpha \leq 2$); $Li_aNi_{1-b-c}Co_bB'_cO_{2-\alpha}F'_\alpha$ (where $0.90 \leq a \leq 1.8$, $0 \leq b \leq 0.5$, $0 \leq c \leq 0.05$, and $0 < \alpha < 2$); $Li_aNi_{1-b-c}Co_bB'_cO_{2-\alpha}F'_2$ (where $0.90 \leq a \leq 1.8$, $0 \leq b \leq 0.5$, $0 \leq c \leq 0.05$, and $0 < \alpha < 2$); $Li_aNi_{1-b-c}Mn_bB'_cD'_\alpha$ (where $0.90 \leq a \leq 1.8$, $0 \leq b \leq 0.5$, $0 \leq c \leq 0.05$, and $0 < \alpha \leq 2$); $Li_aNi_{1-b-c}Mn_bB'_cO_{2-\alpha}F'_\alpha$ (where $0.90 \leq a \leq 1.8$, $0 \leq b \leq 0.5$, $0 \leq c \leq 0.05$, and $0 < \alpha < 2$); $Li_aNi_{1-b-c}Mn_bB'_cO_{2-\alpha}F'_2$ (where $0.90 \leq a \leq 1.8$, $0 \leq b \leq 0.5$, $0 \leq c \leq 0.05$, and $0 < \alpha < 2$); $Li_aNi_bE_cG_dO_2$ (where $0.90 \leq a \leq 1.8$, $0 \leq b \leq 0.9$, $0 \leq c \leq 0.5$, and $0.001 \leq d \leq 0.1$.); $Li_aNi_bCo_cMn_dGeO_2$ (where $0.90 \leq a \leq 1.8$, $0 \leq b \leq 0.9$, $0 \leq c \leq 0.5$, $0 \leq d \leq 0.5$, and $0.001 \leq e \leq 0.1$.); $Li_aNiG_bO_2$ (where $0.90 \leq a \leq 1.8$ and $0.001 \leq b \leq 0.1$.); $Li_aCoG_bO_2$ (where $0.90 \leq a \leq 1.8$ and $0.001 \leq b \leq 0.1$.); $Li_aMnG_bO_2$ (where $0.90 \leq a \leq 1.8$ and $0.001 \leq b \leq 0.1$.); $Li_aMn_2G_bO_4$ (where $0.90 \leq a \leq 1.8$ and $0.001 \leq b \leq 0.1$.); $QO_2$; $QS_2$; $LiQS_2$; $V_2O_5$; $LiV_2O_5$; $LiI'O_2$; $LiNiVO_4$; $Li_{(3-f)}J_2(PO_4)_3$ (where $0 \leq f \leq 2$); $Li_{(3-f)}Fe_2(PO_4)_3$ (where $0 \leq f \leq 2$); and $LiFePO_4$. A combination comprising at least one of the foregoing may also be used.

In the formulae above, A may include nickel (Ni), cobalt (Co), manganese (Mn), or a combination thereof; B' may include aluminum (Al), nickel (Ni), cobalt (Co), manganese (Mn), chromium (Cr), iron (Fe), magnesium (Mg), strontium (Sr), vanadium (V), a rare earth element, or a combination thereof; D' may include oxygen (O), fluorine (F), sulfur (S), phosphorus (P), or a combination thereof; E may include cobalt (Co), manganese (Mn), or a combination thereof; F' may include fluorine (F), sulfur (S), phosphorus (P), or a combination thereof; G may include aluminum (Al), chromium (Cr), manganese (Mn), iron (Fe), magnesium (Mg), lanthanum (La), cerium (Ce), strontium (Sr), vanadium (V), or a combination thereof; Q may include titanium (Ti), molybdenum (Mo), manganese (Mn), or a combination thereof; I' may include chromium (Cr), vanadium (V), iron (Fe), scandium (Sc), yttrium (Y), or a combination thereof; and J may include vanadium (V), chromium (Cr), manganese (Mn), cobalt (Co), nickel (Ni), copper (Cu), or a combination thereof.

A positive electrode may be prepared by the following method.

The positive electrode may be prepared by applying, drying, and pressing a positive active material on a positive electrode current collector. In addition to the above-described positive active materials, a positive active material composition in which the positive active material, a binder, and a solvent are mixed may be prepared.

The positive active material composition may further include a conductive agent or a filler.

In one or more embodiments, the positive active material composition may directly be coated on a metallic current collector and then dried to prepare a positive electrode plate. In one or more embodiments, the positive active material composition may be cast on a separate support to form a positive active material film, which may then be separated from the support and laminated on a metallic current collector to prepare a positive electrode plate.

In some embodiments, a loading level of the prepared positive active material composition may be about 30 milligrams per square centimeter (mg/cm$^2$) or greater, and in some embodiments, about 35 mg/cm$^2$ or greater, and in some embodiments, about 40 mg/cm$^2$ or greater. In addition, an electrode density of the positive active material composition may be about 3 grams per cubic centimeter (g/cc) or greater, and in some embodiments, about 3.5 g/cc or greater.

In an embodiment, in order to achieve a high cell energy density, a loading level of the prepared positive active material composition may be about 35 mg/cm$^2$ to about 50 mg/cm$^2$, and an electrode density thereof may be about 3.5 g/cc to about 4.2 g/cc.

In another embodiment, both surfaces of the positive electrode plate may be coated with the positive active material composition at a loading level of about 37 mg/cm$^2$ and an electrode density of about 3.6 g/cc.

When a loading level and an electrode density of the positive active material are within any of the above-described ranges, a battery including the positive active material may have a high cell energy density of about 500 watt-hours per liter (Wh/L) or greater. For example, the battery may have a cell energy density of about 500 Wh/L to about 900 Wh/L.

Examples of the solvent include, but are not limited to, N-methyl-pyrrolidone (NMP), acetone, and water. An amount of the solvent may be in a range of about 10 parts to about 100 parts by weight, based on 100 parts by weight of the positive active material. When the amount of the solvent is within this range, a process for forming a positive active material layer may be performed efficiently.

The conductive agent may be added in an amount of about 1 wt % to about 30 wt % based on the total weight of the positive active material composition. The conductive agent may be any material having suitable electrical conductivity without causing an undesirable chemical change in a battery. Examples of the conductive agent include graphite, such as natural graphite or artificial graphite; a carbonaceous material, such as carbon black, acetylene black, Ketjen black, channel black, furnace black, lamp black, and thermal black; conductive fibers, such as carbon fibers and metal fibers; a metal powder of fluorinated carbon, aluminum, or nickel; conductive whiskers, such as zinc oxide or potassium titanate; a conductive metal oxide, such as titanium oxide; and a conductive material, such as a polyphenylene derivative. A combination comprising at least one of the foregoing may also be used.

The binder is a component which may assist bonding of the positive active material to the conductive agent and to the current collector, and may be added in an amount of about 1 wt % to about 30 wt % based on the total weight of the positive active material composition. Examples of the binder may include polyvinylidene fluoride (PVdF), polyvinylidene chloride, polybenzimidazole, polyimide, polyvinylacetate, polyacrylonitrile, polyvinylalcohol, carboxymethylcellulose (CMC), starch, hydroxypropylcellulose, regenerated cellulose, polyvinylpyrrolidone, tetrafluoroethylene, polyethylene, polypropylene, polystyrene, polymethylmethacrylate, polyaniline, acrylonitrile butadiene styrene, a phenol resin, an epoxy resin, polyethyleneterephthalate, polytetrafluoroethylene, polyphenylenesulfide, polyamideimide, polyetherimide, polyether sulfone, polyamide, polyacetal, polyphenylene oxide, polybutylene terephthalate, an ethylene-propylene-diene monomer (EPDM), a sulfonated EPDM, a styrene butadiene rubber (SBR), a fluorine rubber, various suitable copolymers, or a combination thereof. The filler may optionally be included as a component for suppressing expansion of a positive electrode. The filler may not be particularly limited, and may be any suitable fibrous material which does not cause an undesirable chemical change in the battery. Examples of the filler may include olefin polymers, such as polyethylene and polypropylene, and fibrous materials, such as glass fibers and carbon fibers.

Amounts of the positive active material, the conductive agent, the filler, the binder, and the solvent may be determined by those of skill in the art without undue experimentation. At least one of the conductive agent, the filler, the binder, and the solvent may be omitted according to a use and a structure of a lithium battery.

In some embodiments, NMP may be used as a solvent, PVdF or a PVdF copolymer may be used as a binder, and carbon black or acetylene black may be used as a conductive agent. For example, 94 wt % of a positive active material, 3 wt % of a binder, and 3 wt % of a conductive agent may be mixed in powder form, and then NMP may be added thereto such that slurry is formed having a solid content of 70 wt %. This slurry may then be coated on a current collector, dried, and roll-pressed to prepare a positive electrode plate.

The positive electrode current collector may have a thickness in a range of about 3 micrometers (μm) to about 500 μm. The positive electrode current collector is not particularly limited and may be any suitable material as long as the positive electrode current collector has suitable electrical conductivity without causing an undesirable chemical change in the battery. Examples of the positive electrode current collector include stainless steel, aluminum, nickel, titanium, sintered carbon, and aluminum, or stainless steel which is surface-treated with carbon, nickel, titanium, or silver. The positive electrode current collector may be processed to have fine bumps on surfaces thereof so as to enhance the binding of the positive active material to the positive electrode current collector. The positive electrode current collector may be used in any of various forms including films, sheets, foils, nets, porous structures, foams, and non-woven fabrics.

In some embodiments, the negative electrode may include a negative active material and/or a carbonaceous negative active material that includes a metal alloyable with lithium.

In some embodiments, the negative active material including a metal alloyable with lithium may include silicon (Si), a silicon-carbon (Si—C) composite material including Si particles, $SiO_{a'}$ (wherein $0<a'<2$), or a combination thereof.

In some embodiments, an average particle diameter of the Si particles in the Si—C composite material may be less than 200 nanometers (nm).

For example, a capacity of the Si—C composite material may be in a range of about 600 milliampere-hours per gram (mAh/g) to about 2000 mAh/g. For example, a capacity of the Si—C composite material may be in a range of about 800 mAh/g to about 1600 mAh/g.

SiO or the Si—C composite material may be combined with a graphite material to prepare a mixture. For example, 12% of a Si—C composite material having a capacity of 1300 mAh/g, 85% of graphite, and 3% of a binder may be used to prepare a negative electrode having a capacity of 500 mAh/g, and the performance of a battery including the negative electrode is better than the performance of a battery prepared using SiO or a Si—C composite material having a capacity of 500 mAh/g.

For example, the carbonaceous negative active material may include graphite.

Examples of the negative electrode may include, in addition to the aforementioned negative active material, Sn, Al, Ge, Pb, Bi, Sb, a Si—Y' alloy (where Y' may be an alkali metal, an alkali earth metal, a Group 13 element, a Group 14 element, a transition metal, a rare-earth element, or a combination thereof, and Y' may not be Si), and a Sn—Y' alloy (where Y' may be an alkali metal, an alkali earth metal, a Group 13 element, a Group 14 element, a transition metal, a rare-earth element, or a combination thereof, and Y' may not be Sn). In some embodiments, Y' may be magnesium (Mg), calcium (Ca), strontium (Sr), barium (Ba), radium (Ra), scandium (Sc), yttrium (Y), titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), germanium (Ge), phosphorus (P), arsenic (As), antimony (Sb), bismuth (Bi), sulfur (S), selenium (Se), tellurium (Te), polonium (Po), or a combination thereof.

A negative electrode may be prepared by the following method.

The negative electrode may be prepared by applying, drying, and pressing a negative active material on a negative electrode current collector. In addition to the above-described negative electrode active materials, a negative active material composition in which a binder and a solvent are mixed, may be prepared.

The negative active material composition may further include a conductive agent or a filler.

In one or more embodiments, the negative active material, the binder, the solvent, the conductive agent, and the filler used for the positive active material composition may also be used to prepare the negative active material composition.

In the negative active material composition, water may be used as a solvent. For example, water may be used as a solvent, CMC or SBR, acrylate, or methacrylate copolymers may be used as a binder, and carbon black, acetylene black, and graphite may be used as a conductive agent. For example, 94 wt % of a negative active material including a Si—C composite material and graphite, 3 wt % of a binder, and 3 wt % of a conductive agent may be mixed in powder form, and water as a solvent is added to prepare a slurry having a solids content of 70 wt %. Then, the slurry may be coated, dried, and pressed on a negative electrode current collector to prepare a negative electrode plate.

An amount of the negative active material may be determined according to a loading level of the positive active material.

For example, a capacity of the negative active material composition per gram (g) may be from about 12 $mg/cm^2$, in other embodiments, from about 15 $mg/cm^2$. Also, an electrode density of the negative active material composition may be from about 1.5 g/cc, in other embodiments, from about 1.6 g/cc.

The capacity per g may be changed by controlling a ratio of a Si—C composite material and graphite. For example, when the negative active material composition is formed of graphite, the negative electrode may exhibit a capacity of about 360 mAh/g, and when the negative active material composition includes 84% of graphite, 14% of a Si—C composite material having a capacity of 1300 mAh/g, and 2% of a binder, the negative electrode may exhibit a capacity of about 500 mAh/g. When the Si—C composite material is mixed with SiO, a capacity of the negative electrode may be in a range of about 380 mAh/g to about 800 mAh/g. When the capacity is about 380 mAh/g or less, the mixing has no effect, and when the capacity is higher than about 800 mAh/g, a retention ratio may be deteriorated.

In one embodiment, to increase cell energy density, a loading level of the negative active material composition may be in a range of about 15 mg/cm$^2$ in to about 25 mg/cm$^2$, and an electrode density of the negative active material composition may be in a range of about 1.6 g/cc to about 2.3 g/cc.

When the loading level and the electrode density of the negative active material are within the above-described ranges, a battery including the negative active material may exhibit a high cell energy density of about 500 Wh/L or greater.

The negative electrode current collector generally has a thickness of about 3 μm to about 500 μm. The negative electrode current collector is not particularly limited as long as the negative electrode current collector does not cause chemical changes in the battery and has high conductivity. For example, the negative electrode current collector may be formed of copper, stainless steel, aluminum, nickel, titanium, sintered carbon, copper, stainless steel that is surface-treated with carbon, nickel, titanium, or silver, or an aluminum-cadmium alloy. Also, similar to the positive electrode current collector, the negative electrode current collector may have fine irregularities at a surface thereof to increase adhesion between the negative active material and the negative electrode current collector. The negative electrode current collector may be used in any of various forms including films, sheets, foils, nets, porous structures, foams, and non-woven fabrics.

In one embodiment, the lithium secondary battery may have a direct current internal resistance (DCIR) increase ratio of about 150% or lower after 300 charge/discharge cycles at a temperature of 45° C. under conditions including a charge/discharge current of 1C/1C, a driving voltage in a range of about 2.8 volts (V) to about 4.3 V, and CC-CV 1/10C cut-off.

That is, as the DCIR increase ratio significantly decreases the lithium secondary battery may have excellent battery characteristics compared to a conventional Ni-rich lithium secondary battery.

For example, a driving voltage of the lithium secondary battery may be in a range of about 2.8 V to about 4.3 V.

For example, an energy density of the lithium secondary battery may be about 500 Wh/L or greater.

In an embodiment, the lithium secondary battery may further include a separator between the positive electrode and the negative electrode. The separator may be an insulating thin film having excellent ion permeability and mechanical strength. The separator may have a pore diameter in a range of about 0.001 μm to about 1 μm, and a thickness thereof may be in a range of about 3 μm to about 30 μm in general. Examples of the separator include a chemically resistant and hydrophobic olefin polymer, e.g., polypropylene; and a sheet or non-woven fabric formed of glass fibers or polyethylene. When a solid electrolyte is used as an electrolyte, the solid electrolyte may serve as a separator.

The electrolyte may further include, in addition to the foregoing electrolyte, an organic solid electrolyte and an inorganic solid electrolyte.

Examples of the organic solid electrolyte may include a polyethylene derivative, a polyethylene oxide derivative, a polypropylene oxide derivative, a phosphoric acid ester polymer, polyester sulfide, a polyvinyl alcohol, PVdF, and a polymer including a dissociable ionic group.

Examples of the inorganic solid electrolyte may include lithium nitrides, lithium halides, and lithium sulfates, such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, and $Li_3PO_4$—$Li_2S$—$SiS_2$.

The lithium secondary battery may be prepared by any suitable method, for example, the lithium secondary battery may be prepared by injecting an electrolyte between a positive electrode and a negative electrode.

The aforementioned positive electrode, negative electrode, and separator may be wound or folded, and then sealed in a battery case. Then, the battery case may be filled with an electrolyte and sealed by a cap assembly member to thereby complete the preparation of a lithium secondary battery. The battery case may be a cylindrical type, a rectangular type, or a thin-film type.

The lithium secondary battery may be classified as a winding type or a stack type depending on a structure of electrodes, or as a cylindrical type, a rectangular type, a coin type, or a pouch type, depending on an exterior shape thereof.

Methods of manufacturing a lithium secondary battery are known and thus a detailed description thereof is omitted.

According to an aspect, a battery module may include the lithium secondary battery as a unit battery.

According to another aspect, a battery pack may include the battery module.

According to still another aspect, a device may include the battery pack. Examples of the device may include power tools powered by an electric motor; electric cars, e.g., electric vehicles (EVs), hybrid electric vehicles (HEVs), and plug-in hybrid electric vehicles (PHEVs); electric two-wheeled vehicles, e.g., e-bikes and e-scooters; electric golf carts; and power storage systems, but embodiments of the device are not limited thereto.

In addition, the lithium secondary battery may be used in any applications that utilize high-power output and a high voltage power source, and which operate under high-temperature conditions.

One or more embodiments will now be described in more detail with reference to the following examples. However, these examples are provided for illustrative purposes only and should not be construed as limiting the scope of the one or more embodiments.

EXAMPLES

Example 1

Preparation of Positive Electrode $Li_{1.02}Ni_{0.80}Co_{0.15}Mn_{0.05}O_2$, as a positive active material, carbon black, as a conductive agent, and PVdF as a binder, were added in a weight ratio of 94:3:3 to NMP and mixed and dispersed therein to prepare a mixture. Subsequently, the mixture was dispersed and coated onto both surfaces of an aluminum foil having a thickness of about 12 μm, wherein a surface area of each of the two surfaces was 37 mg/cm$^2$. The aluminum foil was then dried and roll-pressed to prepare a positive electrode having an electrode density of 3.6 g/cc.

Preparation of Negative Electrode

Graphite, CMC, and SBR were added in a weight ratio of 98:1.5:0.5 to water and mixed and dispersed therein to prepare a mixture. Subsequently, the mixture was dispersed and coated onto both surfaces of a copper foil having a thickness of about 10 μm, wherein a surface area of each of the two surfaces was 21.42 mg/cm$^2$. The copper foil was then dried and roll-pressed to prepare a negative electrode having an electrode density of 1.65 g/cc.

Preparation of Electrolyte 1.5 wt % of VC and 1 wt % of Compound 1 (phosphite compound) were added to 1.15 M of $LiPF_6$ and EC/EMC/DMC (at a volume ratio of 20/40/40) based on the total weight of an electrolyte to prepare an electrolyte.

Compound 1

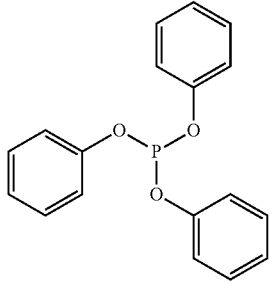

Preparation of Lithium Secondary Battery

A separator formed of polypropylene having a thickness of 16 μwas disposed between the positive electrode and the negative electrode, and the electrolyte was injected thereto, thereby completing the manufacture of a lithium secondary battery.

Example 2

A lithium secondary battery was prepared in the same manner as in Example 1, except that Compound 1 was added in an amount of 2 wt % instead of 1 wt % to prepare the electrolyte.

Example 3

A lithium secondary battery was prepared in the same manner as in Example 1, except that $Li_{1.02}Ni_{0.85}Co_{0.10}Mn_{0.05}O_2$ was used as a positive active material.

Example 4

A lithium secondary battery was prepared in the same manner as in Example 1, except that $Li_{1.02}Ni_{0.88}Co_{0.08}Mn_{0.04}O_2$ was used as a positive active material.

Example 5

A lithium secondary battery was prepared in the same manner as in Example 4, except that Compound 2 instead of Compound 1 was added in an amount of 1 wt % based on the total weight of the electrolyte.

Compound 2

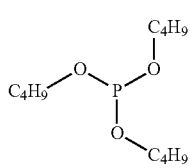

Example 6

A lithium secondary battery was prepared in the same manner as in Example 1, except that $Li_{1.02}Ni_{0.88}Co_{0.08}Al_{0.04}O_2$ was used as a positive active material.

Example 7

A lithium secondary battery was prepared in the same manner as in Example 6, except that Compound 2 instead of Compound 1 was added in an amount of 1 wt % based on the total weight of the electrolyte.

Comparative Example 1

A lithium secondary battery was prepared in the same manner as in Example 1, except that Compound 1 was not added to prepare the electrolyte.

Comparative Example 2

A lithium secondary battery was prepared in the same manner as in Example 2, except that $Li_{1.02}Ni_{0.60}Co_{0.02}Mn_{0.20}O_2$ was used as a positive active material.

Comparative Example 3

A lithium secondary battery was prepared in the same manner as in Example 1, except that Compound 1 was added in an amount of 3 wt % instead of 1 wt % to prepare the electrolyte.

Example 8

Preparation of Positive Electrode

The positive electrode prepared in Example 1 was used.

Preparation of Negative Electrode

SCN (available from BTR New Energy Materials; an active material designed to exhibit a capacity of 1300 mAh/g by carbon coating graphite after dispersing Si particles having a size of 100 nm on the graphite), graphite, CMC, and SBR were added in a weight ratio of 25:73:1.5:0.5 to water and mixed and dispersed therein to prepare a mixture. Subsequently, the mixture was dispersed and coated onto both surfaces of a copper foil having a thickness of about 10 μm, wherein a surface area of each of the two surfaces was 18.42 mg/cm². The copper foil was then dried and roll-pressed to prepare a negative electrode having an electrode density of 1.65 g/cc. Here, SCN is carbon-coated Si particles on graphite.

Preparation of Electrolyte 1.5 wt % of VC and 1 wt % of Compound 1 were added to 1.15 M of $LiPF_6$ and FEC/EC/EMC/DMC (at a volume ratio of 7/7/46/40) based on the total weight of an electrolyte to prepare an electrolyte.

Preparation of Lithium Secondary Battery

A separator formed of polypropylene having a thickness of 16 microns was disposed between the positive electrode and the negative electrode, and the electrolyte was injected thereto, thereby completing the manufacture of a lithium secondary battery.

Example 9

A lithium secondary battery was prepared in the same manner as in Example 8, except that Compound 1 was added in an amount of 2 wt % instead of 1 wt % to prepare the electrolyte.

Example 10

A lithium secondary battery was prepared in the same manner as in Example 8, except that $Li_{1.02}Ni_{0.85}Co_{0.10}Mn_{0.05}O_2$ was used as a positive active material.

Example 11

A lithium secondary battery was prepared in the same manner as in Example 8, except that $Li_{1.02}Ni_{0.88}Co_{0.08}Mn_{0.04}O_2$ was used as a positive active material.

Example 12

A lithium secondary battery was prepared in the same manner as in Example 11, except that Compound 2 instead of Compound 1 was added in an amount of 1 wt % based on the total weight of the electrolyte to prepare the electrolyte.

Example 13

A lithium secondary battery was prepared in the same manner as in Example 8, except that $Li_{1.02}Ni_{0.88}Co_{0.08}Al_{0.04}O_2$ was used as a positive active material.

Example 14

A lithium secondary battery was prepared in the same manner as in Example 13, except that Compound 2 instead of Compound 1 was added in an amount of 1 wt % based on the total weight of the electrolyte to prepare the electrolyte.

Comparative Example 4

A lithium secondary battery was prepared in the same manner as in Example 8, except that Compound 1 was not added to prepare the electrolyte.

Comparative Example 5

A lithium secondary battery was prepared in the same manner as in Example 9, except that $Li_{1.02}Ni_{0.60}Co_{0.20}Mn_{0.20}O_2$ was used as a positive active material.

Comparative Example 6

A lithium secondary battery was prepared in the same manner as in Example 8, except that Compound 2 instead of Compound 1 was added at an amount of 3 wt % to prepare the electrolyte.

Example 15

Preparation of Positive Electrode
The positive electrode prepared in Example 1 was used.
Preparation of Negative Electrode
The negative electrode prepared in Example 8 was used.
Preparation of Electrolyte
1.0 wt % of VC, 0.3 wt % of maleic anhydride (MA), and 1 wt % of Compound 1 were added to 1.15 M of $LiPF_6$ and FEC/EC/EMC/DMC (at a volume ratio of 7/7/46/40), with amounts based on the total weight of an electrolyte to prepare an electrolyte.
Preparation of Lithium Secondary Battery
A separator formed of polypropylene having a thickness of 16 microns was disposed between the positive electrode and the negative electrode, and the electrolyte was injected thereto, thereby completing the manufacture of a lithium secondary battery.

Example 16

A lithium secondary battery was prepared in the same manner as in Example 15, except that Compound 1 was added in an amount of 2 wt % instead of 1 wt %, based on the total weight of the electrolyte to prepare the electrolyte.

Example 17

A lithium secondary battery was prepared in the same manner as in Example 15, except that $Li_{1.02}Ni_{0.85}Co_{0.10}Mn_{0.05}O_2$ was used as a positive active material.

Example 18

A lithium secondary battery was prepared in the same manner as in Example 15, except that $Li_{1.02}Ni_{0.88}Co_{0.08}Mn_{0.04}O_2$ was used as a positive active material.

Example 19

A lithium secondary battery was prepared in the same manner as in Example 18, except that Compound 2 instead of Compound 1 was added in an amount of 1 wt %, based on the total weight of the electrolyte to prepare the electrolyte.

Example 20

Preparation of Positive Electrode
The positive electrode prepared in Example 1 was used.
Preparation of Negative Electrode
The negative electrode prepared in Example 8 was used.
Preparation of Electrolyte
1.0 wt % of VC, 0.3 wt % of MA, 0.3 wt % of methylene methane disulfonate (MMDS), and 1 wt % of Compound 1 were added to 1.15 M of $LiPF_6$ and FEC/EC/EMC/DMC (at a volume ratio of 7/7/46/40), based on the total weight of an electrolyte to prepare an electrolyte.

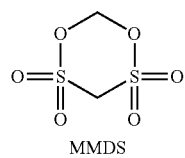

MMDS

Preparation of Lithium Secondary Battery

A separator formed of polypropylene having a thickness of 16 microns was disposed between the positive electrode and the negative electrode, and the electrolyte was injected thereto, thereby completing the manufacture of a lithium secondary battery.

Example 21

A lithium secondary battery was prepared in the same manner as in Example 20, except that Compound 1 was added in an amount of 2 wt % instead of 1 wt %, based on the total weight of the electrolyte to prepare the electrolyte.

Example 22

A lithium secondary battery was prepared in the same manner as in Example 20, except that $Li_{1.02}Ni_{0.85}Co_{0.10}Mn_{0.05}O_2$ was used as a positive active material.

Example 23

A lithium secondary battery was prepared in the same manner as in Example 20, except that $Li_{1.02}Ni_{0.88}Co_{0.08}Mn_{0.04}O_2$ was used as a positive active material.

Evaluation Example 1

Lifespan and Resistance Evaluation (1) Negative active material is graphite, and additive includes phosphite compound and VC The lithium secondary batteries prepared in Examples 1 to 7 and Comparative Examples 1 to 3 each underwent 300 charging/discharging cycles at 45° C. under conditions including a charging/discharging current of 1C/1C, a driving voltage in a range of about 2.8 V to about 4.3 V, and CC-CV 1/10C cut-off, and then DCIR increase ratio and lifespan characteristics of each of the batteries were measured. The results are shown in Table 1. Here, lifespan characteristics were determined by calculating a ratio of a capacity of the battery after the 300 charging/discharging cycles based on a capacity of the battery after an initial charging/discharging cycle under the same conditions.

TABLE 1

|  | Lifespan (%) | DCIR increase ratio (%) |
|---|---|---|
| Example 1 | 86 | 131 |
| Example 2 | 86 | 133 |
| Example 3 | 85 | 138 |
| Example 4 | 82 | 141 |
| Example 5 | 83 | 143 |
| Example 6 | 82 | 138 |
| Example 7 | 82 | 141 |
| Comparative Example 1 | 82 | 162 |
| Comparative Example 2 | 79 | 167 |
| Comparative Example 3 | 67 | 178 |

As shown in Table 1, the lithium secondary battery including the electrolyte including the phosphite compound of one of Examples 1 to 7 exhibited excellent lifespan characteristics and a decreased DCIR increase ratio compared to the battery of Comparative Example 1 not including a phosphite compound. Also, when tributyl phosphite and triphenyl phosphite were used as a phosphite compound, all the batteries had excellent lifespan characteristics and a DCIR increase ratio of about 150% or less.

Without being limited by theory, it is believed that the increased lifespan and decreased DCIR increase ratio resulted because a stable protecting layer is formed by the phosphite compound on a surface of the negative electrode including graphite, and thus, in spite of repeated charging/discharging processes, the electrochemical characteristics of the negative electrode were maintained.

The battery of Comparative Example 2 including a positive electrode containing a small amount of Ni had a decreased lifespan and an increased DCIR increase ratio, compared to the batteries of Examples 1 to 7. When the amount of Ni is small, a surface state of the battery is stable compared to a Ni-rich positive electrode, and when phosphite is added thereto, the result may be an in increase in resistance and deterioration of a retention ratio.

Also, in a case of the battery containing a large amount of phosphite prepared in Comparative Example 3, the battery had a decreased lifespan and an increased DCIR increase ratio compared to the batteries of Examples 1 to 7. Without being limited by theory, it is believed that this may have occurred due to significant self-decomposition of the phosphite compound, and thus a thin film resistance was increased, which resulted in deterioration of battery capacity, storage stability, and cycle characteristics when an amount of the phosphite compound in the electrolyte is 3 wt % or higher.

(2) Negative active material is silicon (Si) and a graphite composite material, and an additive includes phosphite compound, VC, and FEC The lithium secondary batteries prepared in Examples 8 to 14 and Comparative Examples 4 to 6 each underwent 300 charging/discharging cycles at 45° C. under conditions including a charging/discharging current of 1C/1C, a driving voltage in a range of about 2.8 V to about 4.3 V, and CC-CV 1/10C cut-off, and then a DCIR increase ratio and lifespan characteristics of each of the batteries were measured. The results are shown in Table 2. Here, lifespan characteristics were determined by calculating a ratio of a capacity of the battery after the 300 charging/discharging cycles based on a capacity of the battery after an initial (e.g., first) charging/discharging cycle under the same conditions.

TABLE 2

|  | Lifespan (%) | DCIR increase ratio (%) |
|---|---|---|
| Example 8 | 82 | 134 |
| Example 9 | 82 | 137 |
| Example 10 | 81 | 134 |
| Example 11 | 80 | 138 |
| Example 12 | 80 | 141 |
| Example 13 | 80 | 143 |
| Example 14 | 80 | 137 |
| Comparative Example 4 | 81 | 157 |
| Comparative Example 5 | 73 | 172 |
| Comparative Example 6 | 54 | 196 |

As shown in Table 2, the lithium secondary battery including the electrolyte including the phosphite compound of one of Examples 8 to 14, exhibited excellent lifespan characteristics and a decreased DCIR increase ratio compared to the battery of Comparative Example 4 not including a phosphite compound. Also, when tributyl phosphite and triphenyl phosphite were used as a phosphite compound, all the batteries had excellent lifespan characteristics and a DCIR increase ratio of about 150% or lower.

Without being limited by theory, it is believed that in the case of the graphite negative electrode, the excellent lifespan characteristics and a decreased DCIR increase ratio result because a stable protecting layer due to a phosphite compound is formed on a surface of the negative electrode including Si and a graphite composite material, and thus, even after repeating charging/discharging processes, electrochemical characteristics of the negative electrode were maintained.

The battery of Comparative Example 4 using a positive electrode containing a small amount of Ni had a decreased lifespan and an increased DCIR increase ratio, compared to the batteries of Examples 8 to 14, as well as in the case of the graphite negative electrode.

Also, in a case of the battery containing a large amount of phosphite prepared in Comparative Example 6, the battery had a decreased lifespan and an increased DCIR increase ratio compared to the batteries of Examples 8 to 14. Without being limited be theory, it is believe that this may have occurred as a result of significant self-decomposition of the phosphite compound, and thus thin film resistance was increased, which resulted in deterioration of battery capacity, storage stability, and cycle characteristics when an amount of the phosphite compound in the electrolyte is 3 wt % or higher.

(3) A negative active material is Si and a graphite composite material, and an additive includes phosphite compound, VC, FEC, and MA The lithium secondary batteries prepared in Examples 15 to 23 each underwent 300 charging/discharging cycles at 45° C. under conditions including a charging/discharging current of 1C/1C, a driving voltage in a range of about 2.8 V to about 4.3 V, and CC-CV 1/10C cut-off, and then a DCIR increase ratio and lifespan characteristics of each of the batteries were measured. The results are shown in Table 3. Here, lifespan characteristics were determined by calculating a ratio of a capacity of the battery after the 300 charging/discharging cycles based on a capacity of the battery after an initial (e.g., first) charging/discharging cycle under the same conditions.

TABLE 3

|  | Lifespan (%) | DCIR increase ratio (%) |
| --- | --- | --- |
| Example 15 | 82 | 132 |
| Example 16 | 83 | 135 |
| Example 17 | 82 | 134 |
| Example 18 | 81 | 131 |
| Example 19 | 81 | 135 |
| Example 20 | 83 | 123 |
| Example 21 | 83 | 121 |
| Example 22 | 83 | 122 |
| Example 23 | 81 | 124 |

As shown in Table 3, the lithium secondary batteries of Examples 15 to 23 all exhibited excellent lifespan characteristics and a DCIR increase ratio of about 150% or lower. In particular, the batteries of Examples 21 to 23 further including MMDS in the electrolyte had a relatively low DCIR increase ratio of about 130% or lower. Without being limited by theory, it is believed that when the electrolyte includes MMDS, the MMDS reacts with the cation $Ni^{3+}$, which stabilizes the cation $Ni^{3+}$ and results in a decrease in resistance.

As described above, according to one or more embodiments, when an amount of Ni in a positive active material increases, a capacity of a battery may be maximized, and a phosphite compound may be included in an electrolyte to improve the lifespan characteristics and the resistance characteristics of a lithium secondary battery including the positive active material.

It should be understood that embodiments described herein should be considered in a descriptive sense only and not for purposes of limitation. Descriptions of features or aspects within each embodiment should be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. A lithium secondary battery, comprising:
a positive electrode;
a negative electrode; and
an electrolyte disposed between the positive electrode and the negative electrode,
wherein the positive electrode comprises a positive active material represented by Formula 1, and
wherein the electrolyte comprises:
a lithium salt;
a non-aqueous solvent; and
a phosphite compound represented by Formula 2,
wherein the phosphite compound is present in an amount in a range of about 0.1 weight percent to about 5 weight percent based on a total weight of the electrolyte:

Formula 1

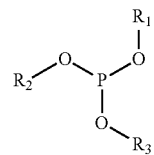

Formula 2 wherein, in Formula 1,
$0.9<x<1.2$, $0.7<y<0.98$, and $0<z<0.2$;
M comprises Al, Mg, Mn, Co, Fe, Cr, V, Ti, Cu, B, Ca, Zn, Zr, Nb, Mo, Sr, Sb, W, Bi, or a combination thereof; and
A is an element having an oxidation number of −1 or −2; and
wherein in Formula 2,
R1 to R3 are each independently an unsubstituted linear or branched $C_1$-$C_{30}$ alkyl group or an unsubstituted $C_6$-$C_{60}$ aryl group.

2. The lithium secondary battery of claim 1, wherein the phosphite compound is present in an amount in a range of about 0.1 weight percent to about 3 weight percent based on the total weight of the electrolyte.

3. The lithium secondary battery of claim 1, wherein the phosphite compound comprises tributyl phosphite, triphenyl phosphite, tris(o-tolyl)phosphite, or a combination thereof.

4. The lithium secondary battery of claim 1, wherein the lithium salt comprises lithium difluoro(oxalate)borate, lithium bis(oxalate)borate, lithium difluorobis(oxalate)borate, $LiBF_4$, $LiPF_6$, $LiCF_3SO_3$, $(CF_3SO_2)_2NLi$, $(FSO_2)_2NLi$, or a combination thereof.

5. The lithium secondary battery of claim 1, wherein the non-aqueous solvent comprises dimethyl carbonate, diethyl carbonate, ethylmethyl carbonate, dipropyl carbonate, methylpropyl carbonate, ethylpropyl carbonate, methylethyl carbonate, ethylene carbonate, propylene carbonate, butylene carbonate, tetraethyleneglycoldimethylether, or a combination thereof.

6. The lithium secondary battery of claim 1, wherein the non-aqueous solvent comprises fluoroethylene carbonate.

7. The lithium secondary battery of claim 6, wherein the fluoroethylene carbonate is present in an amount in a range of about 0.1 volume percent to about 10 volume percent based on a total volume of the non-aqueous solvent.

8. The lithium secondary battery of claim 1, wherein the electrolyte comprises a cyclic carbonate comprising a carbon-carbon double bond, a cyclic carboxylic acid anhydride comprising a carbon-carbon double bond, or a combination thereof.

9. The lithium secondary battery of claim 1, wherein the electrolyte further comprises vinylene carbonate, vinylethylene carbonate, maleic anhydride, succinic anhydride, or a combination thereof.

10. The lithium secondary battery of claim 9, wherein vinylene carbonate, maleic anhydride, or the combination thereof is present in an amount in a range of about 0.1 weight percent to about 2 weight percent based on the total weight of the electrolyte.

11. The lithium secondary battery of claim 1, wherein the electrolyte further comprises a sulfone compound, a sulfonate compound, a disulfonate compound, or a combination thereof in an amount in a range of about 0.1 weight percent to about 2 weight percent based on the total weight of the electrolyte.

12. The lithium secondary battery of claim 11, wherein the disulfonate compound is methylene methane disulfonate.

13. The lithium secondary battery of claim 1, wherein, in Formula 1, $0.8 \leq y \leq 0.98$.

14. The lithium secondary battery of claim 1, wherein the positive active material is represented by Formula 3 or Formula 4:

$$Li_{x'}Ni_{y'}Co_{1-y'-z'}Al_{z'}O_2 \quad \text{Formula 3}$$

$$Li_{x'}Ni_{y'}Co_{1-y'-z'}Mn_{z'}O_2 \quad \text{Formula 4}$$

wherein, in Formula 3 and Formula 4, $0.9 \leq x' \leq 1.2$, $0.8 \leq y' \leq 0.98$, $0 < z' < 0.1$, and $0 < 1-y'-z' < 0.2$.

15. The lithium secondary battery of claim 1, wherein the positive active material comprises $Li_{1.02}Ni_{0.80}Co_{0.15}Mn_{0.05}O_2$, $Li_{1.02}Ni_{0.85}Co_{0.10}Mn_{0.05}O_2$, $Li_{1.02}Ni_{0.88}Co_{0.08}Mn_{0.04}O_2$, or $Li_{1.02}Ni_{0.88}Co_{0.08}Al_{0.04}O_2$.

16. The lithium secondary battery of claim 1, wherein the negative electrode comprises a negative active material comprising a metal alloyable with lithium, a carbonaceous negative active material, or a combination thereof.

17. The lithium secondary battery of claim 16, wherein the negative active material comprising a metal alloyable with lithium comprises silicon (Si), a silicon-carbon composite material comprising a Si particle, $SiO_{a'}$ ($0<a'<2$), or a combination thereof.

18. The lithium secondary battery of claim 16, wherein the carbonaceous negative active material comprises graphite.

19. The lithium secondary battery of claim 1, wherein a direct current internal resistance (DCIR) increase ratio of the lithium secondary battery is 150% or less before and after 200 charge/discharge cycles at 45° C.

20. The lithium secondary battery of claim 1, wherein a cell energy density of the lithium secondary battery is about 500 watt-hours per liter or greater.

* * * * *